United States Patent [19]

Kagami et al.

[11] 4,275,333

[45] Jun. 23, 1981

[54] FLUORESCENT COMPOSITIONS AND LOW-VELOCITY ELECTRON EXCITED FLUORESCENT DISPLAY DEVICES UTILIZING THE SAME

[75] Inventors: Akiyasu Kagami, Kanagawa; Yoshinori Tanigami, Odawara, both of Japan

[73] Assignees: Dai Nippon Toryo Co., Ltd., Osaka; Japan Electric Industry Development Association, Tokyo, both of Japan

[21] Appl. No.: 13,430

[22] Filed: Feb. 21, 1979

[30] Foreign Application Priority Data

Feb. 20, 1978 [JP] Japan .................................. 53-18337
Mar. 22, 1978 [JP] Japan .................................. 53-32491
Mar. 22, 1978 [JP] Japan .................................. 53-32492
Mar. 22, 1978 [JP] Japan .................................. 53-32493

[51] Int. Cl.$^3$ .......................... H01J 29/20; C09K 11/50
[52] U.S. Cl. ............................. 313/495; 252/301.4 R; 252/301.4 F; 252/301.4 S; 252/301.4 P; 252/301.6 R; 252/301.6 F; 252/301.6 S; 252/301.6 P
[58] Field of Search .................. 252/301.4 R, 301.4 F, 252/301.4 S, 301.4 P, 301.6 R, 301.6 F, 301.6 S, 301.6 P; 313/495, 496

[56] References Cited

U.S. PATENT DOCUMENTS

| | | |
|---|---|---|
| 2,415,129 | 2/1947 | Froelich . |
| 2,452,518 | 10/1948 | Burns . |
| 2,554,999 | 5/1951 | Merrill et al. . |
| 2,577,161 | 12/1951 | Smith . |
| 2,623,858 | 12/1952 | Kroger . |
| 2,697,077 | 12/1954 | Smith . |
| 2,925,532 | 2/1960 | Larach . |
| 3,080,325 | 3/1963 | Aven et al. ................. 252/301.6 S |
| 3,236,781 | 2/1966 | Veres . |
| 3,623,996 | 11/1971 | Amster . |
| 3,649,553 | 3/1972 | Tanaka et al. ............. 252/301.6 S X |
| 3,655,575 | 4/1972 | Faria . |
| 3,661,791 | 5/1972 | Ropp . |
| 4,081,398 | 3/1978 | Hase et al. ................. 252/301.4 S X |
| 4,116,864 | 9/1978 | Kagami et al. ............. 252/301.6 S |

FOREIGN PATENT DOCUMENTS

43-19858 8/1968 Japan .
48-37914 11/1973 Japan .
50-150287 12/1975 Japan .
51-68485 6/1976 Japan .
53-31835 9/1978 Japan .

OTHER PUBLICATIONS

Leverenz, "An Introduction to Luminescence", J. Wiley & Sons 1950.
Philips Research Report, vol. 7, 1952, pp. 241–250.
Peters et al., "J. Inorg. Nucl. Chem.", 1970, vol. 32, pp. 1089–1095.

*Primary Examiner*—Jack Copper

[57] ABSTRACT

Blue, green, red and yellow emitting fluorescent compositions which emit blue, green, red and yellow light of high luminance under low-velocity electron excitation occurring under acceleration potential below 1KV, particularly below 100V can be obtained by mixing a conductive material having a particle diameter distribution wherein central value is within the range of 2.5 to 14$\mu$ and standard deviation is not more than 0.7, and specific blue, green, red and yellow emitting phosphors in a mixing weight ratio ranging from 1:99 to 1:4, respectively. The conductive material is selected from the group consisting of a conductive metal oxide, mixtures of more than one kind of conductive metal oxide, a conductive metal sulfide, mixtures of more than one kind of conductive metal sulfide and mixtures thereof. These blue, green, red and yellow emitting fluorescent compositions are used as a fluorescent screen of a low-velocity electron excited fluorescent display device.

46 Claims, 10 Drawing Figures

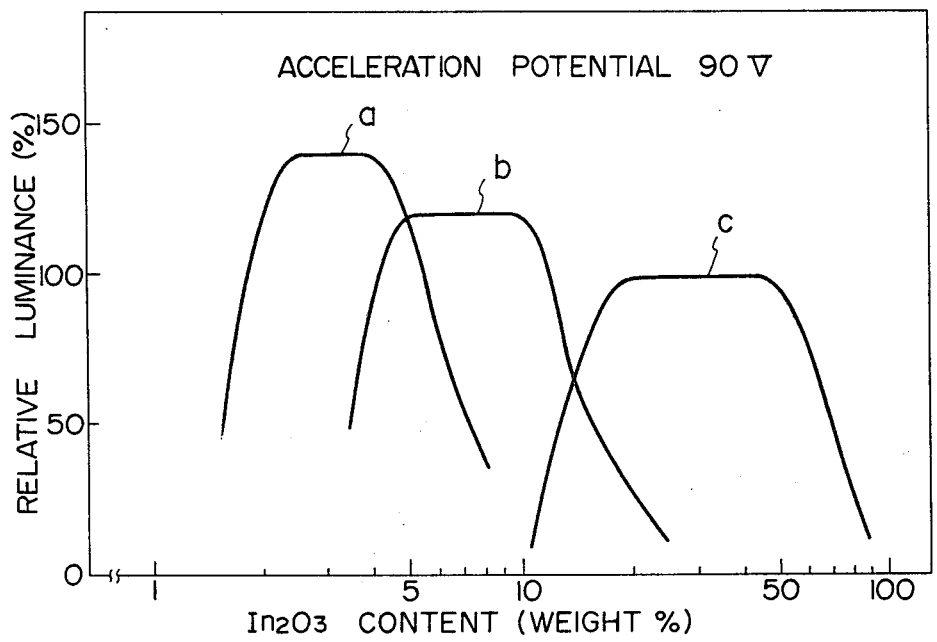
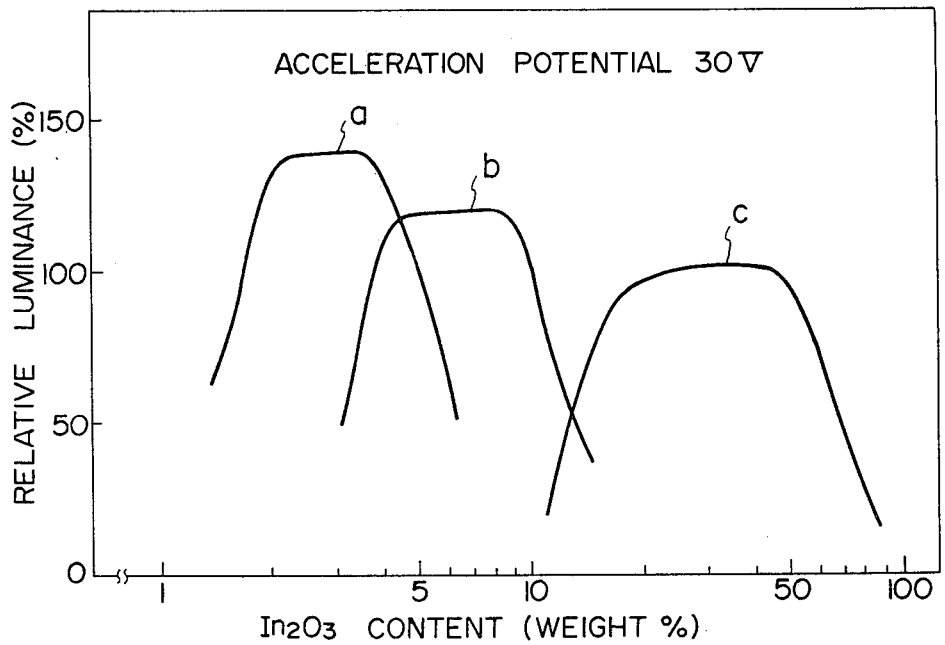

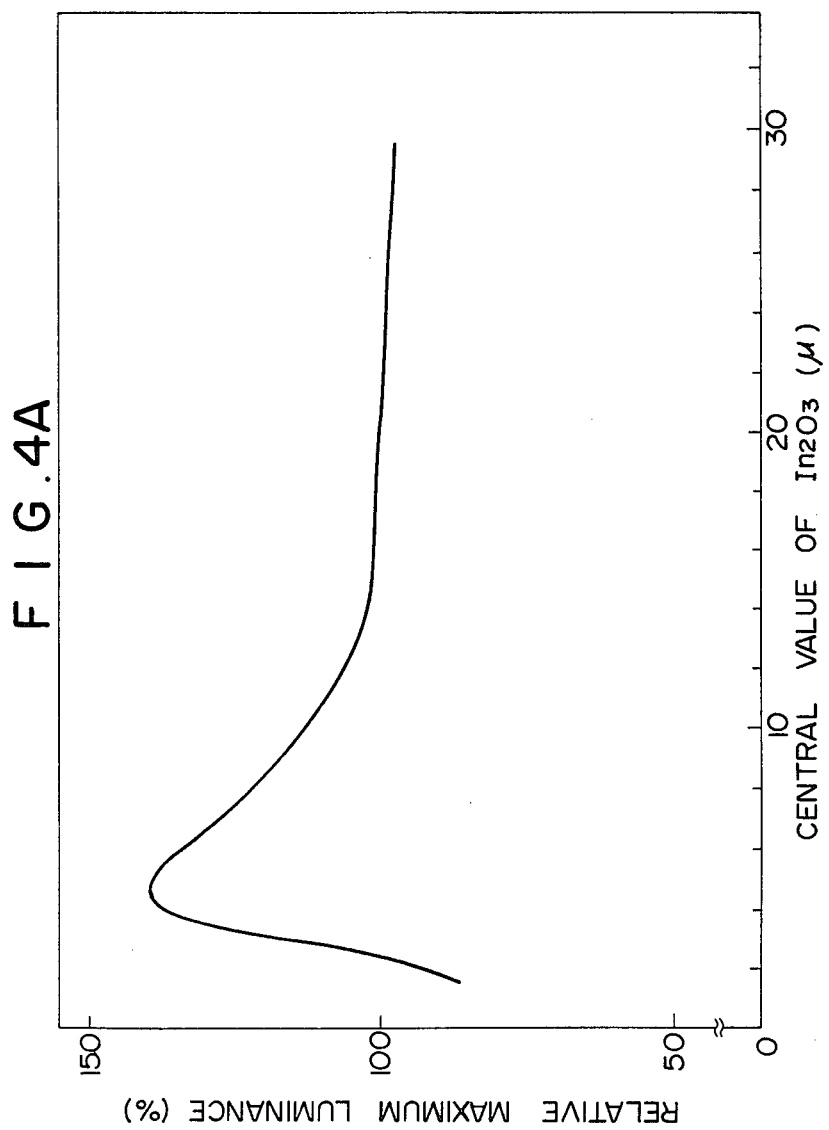

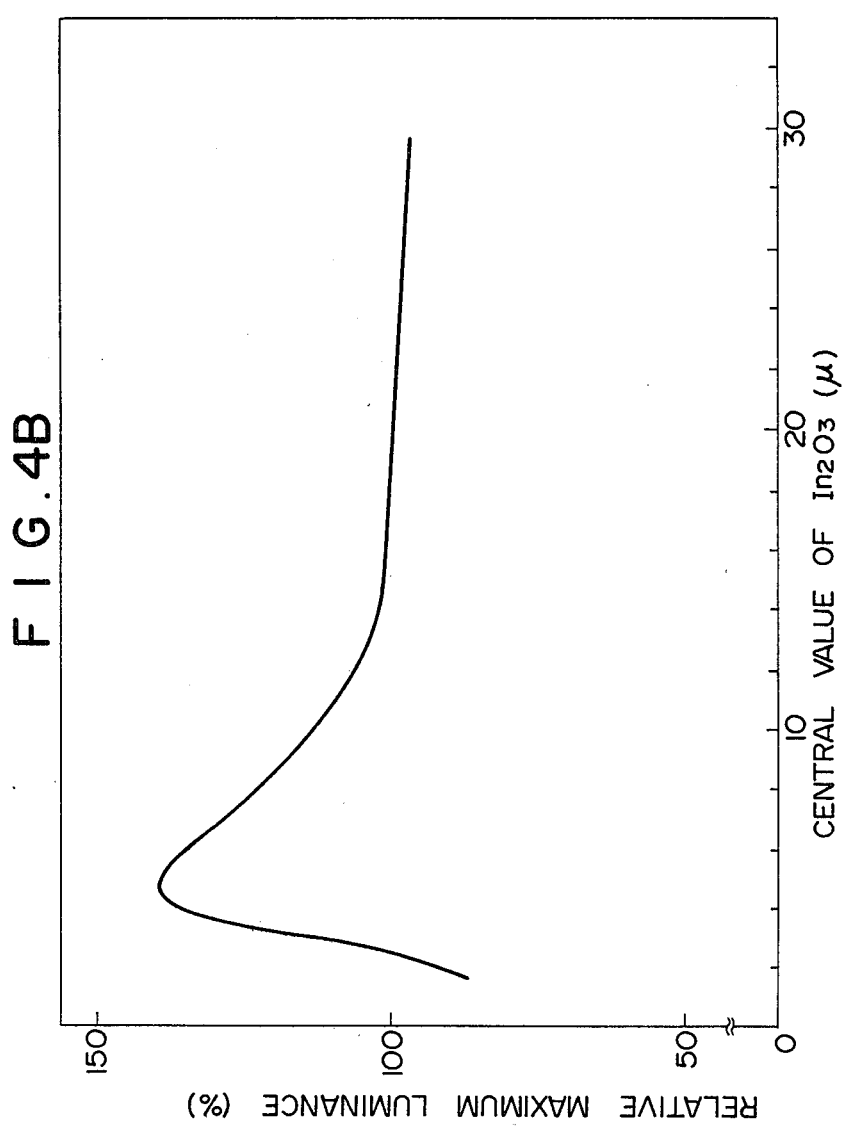

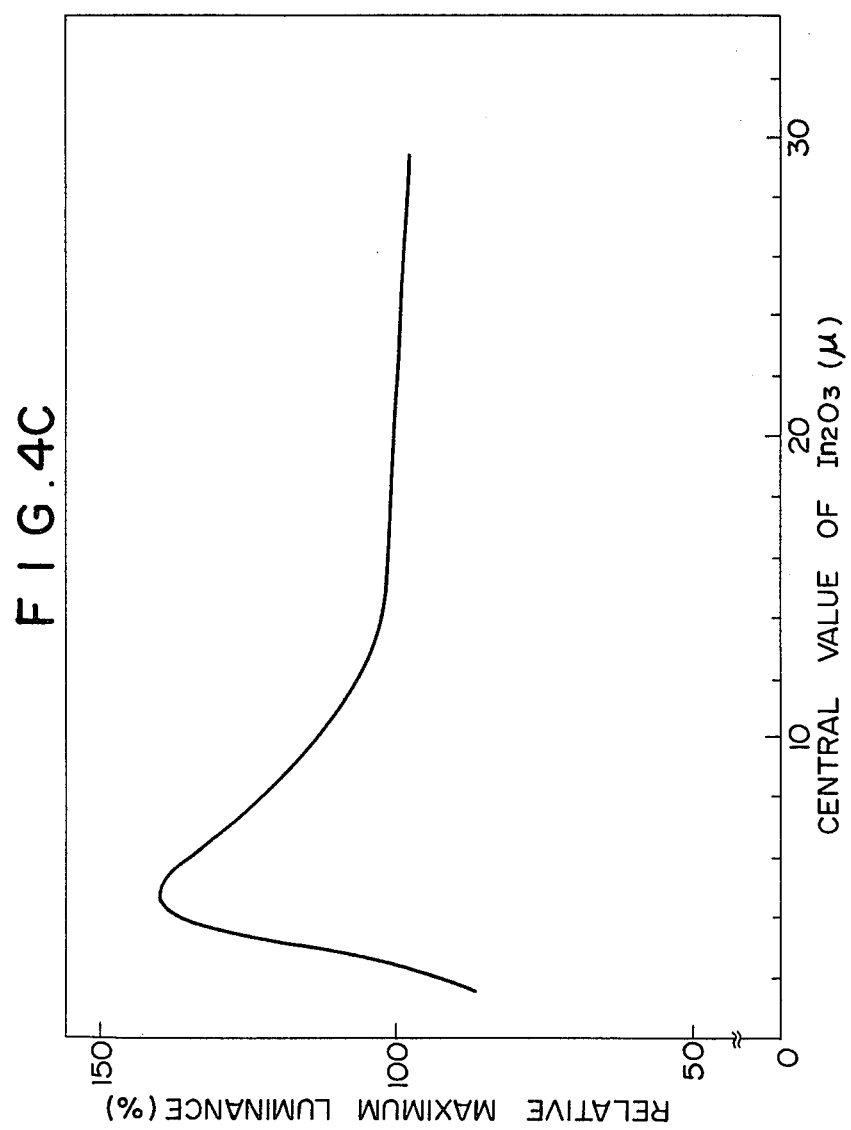

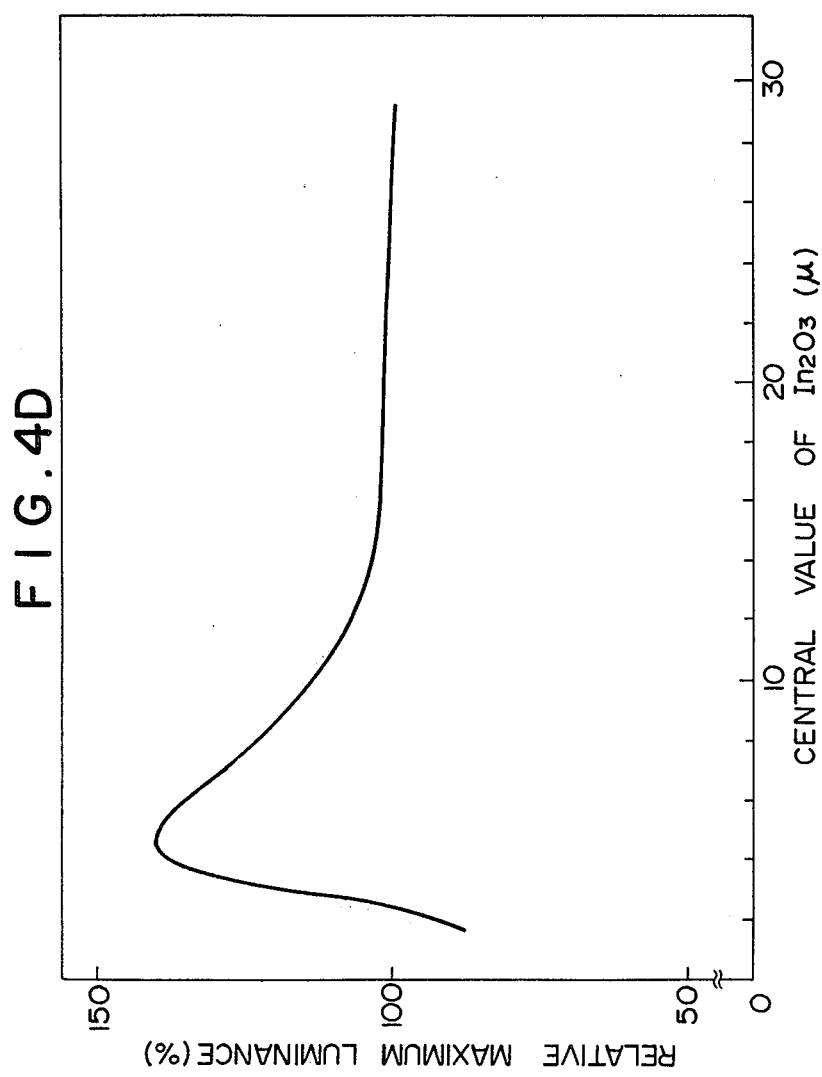

FLUORESCENT COMPOSITIONS AND LOW-VELOCITY ELECTRON EXCITED FLUORESCENT DISPLAY DEVICES UTILIZING THE SAME

BACKGROUND OF THE INVENTION

1. Field of the Invention

This invention relates to fluorescent compositions and low-velocity electron excited fluorescent display devices utilizing the same, and more particularly relates to fluorescent compositions comprising a conductive material having a specific particle diameter distribution and a specific phosphor in a specific mixing ratio, and low-velocity electron excited fluorescent display devices containing these fluorescent compositions as a fluorescent screen.

2. Description of the Prior Art

As is well known, a low-velocity electron excited fluorescent display device (hereinafter referred to as "fluorescent display device") in general has a fundamental structure such that both an anodic plate having a fluorescent screen on one side thereof and a cathode standing face to face with the above-described fluorescent screen are enclosed in an evacuated tube. The fluorescent screen placed on the anodic plate is excited by low-velocity electrons emitted from the cathode to result in emission of light. Both FIGS. 1 and 2 give outlines of typical structures of fluorescent display devices, and they show a diode type display tube and a triode type display tube, respectively. As shown in both FIGS. 1 and 2, one side of an anodic plate 11 made of, for example, an aluminium plate, has a fluorescent screen 12 thereon. The other side of the anodic plate 11 is supported by a ceramic base plate 13. The diode type display tube is equipped with a cathode standing face to face with the above-described fluorescent screen 12 placed on the one side of the anodic plate 11, and emission of light occurs by excitation of the fluorescent screen 12 which arises from low-velocity electrons emitted from the cathode 14. In particular, the triode type display tube shown in FIG. 2 additionally has a grid electrode 15 between the cathode 14 and the fluorescent screen 12 so as to control or diverge low-velocity electrons emitted from the cathode 14. Moreover, when the surface of the fluorescent screen 12 has wide area, two or more cathodes may be additionally placed in both fluorescent display tubes shown in FIG. 1 and FIG. 2 wherein only one cathode is placed, and there is no particular limit to the number of cathodes that can be placed therein. The aforesaid anodic plate 11 having a fluorescent screen 12 on one side thereof, the ceramic base plate 13 and the cathode 14 (which are shown in FIG. 1), or the aforesaid anodic plate 11 having a fluorescent screen 12 on one side thereof, the ceramic base plate 13, the cathode 14 and the grid electrode 15 (which are shown in FIG. 2) are enclosed in a transparent container 16 made of, for example, glass, the pressure inside which is held at a high vacuum of $10^{-5}$ to $10^{-9}$ Torr.

The following fluorescent compositions have heretofore been known as phosphors which can emit light of high luminance under low-velocity electron excitation;

a blue emitting fluorescent composition comprising indium oxide ($In_2O_3$) and a silver activated zinc sulfide blue emitting phosphor (ZnS:Ag) in a mixing weight ratio ranging from 1:9 to 9:1 (Japanese Patent Public Disclosure No. 22911/1977).

a blue emitting fluorescent composition comprising zinc oxide (ZnO) and ZnS:Ag in a mixing weight ratio ranging from 1:9 to 9:1 (Japanese Patent Application Laid Open No. 115787/1977), a green emitting fluorescent composition comprising $In_2O_3$ and a green emitting phosphor selected from the following group in a mixing weight ratio ranging from 1:9 to 9:1, said group consisting of a copper and aluminium activated zinc cadmium sulfide phosphor [$(Zn_{1-b},Cd_b)S:Cu,Al$, wherein b is $0 \leq b \leq 0.1$], a cerium activated yttrium aluminium gallium oxide phosphor [$Y_3(Al_{1-a},Ga_a)_5O_{12}:Ce$, wherein a is $0 \leq a \leq 0.5$], an europium activated strontium gallium sulfide phosphor ($SrGa_2S_4:Eu^{2+}$), a manganese activated zinc silicate phosphor ($Zn_2SiO_4:Mn$), a terbium activated yttrium oxysulfide phosphor ($Y_2O_2S:Tb$) and mixtures thereof (Japanese Patent Public Disclosure No. 239114/1977), a green emitting fluorescent composition comprising $In_2O_3$ and a terbium activated lanthanum yttrium oxysulfide green emitting phosphor [$(La_{1-x},Y_x)_2O_2S:Tb$, wherein x is $0 \leq x \leq 1$] in a mixing weight ratio ranging from 1:9 to 9:1 (Japanese Patent Public Disclosure No. 46916/1977), a green emitting fluorescent composition comprising ZnO and $SrGa_2S_4:Eu^{2+}$ in a mixing weight ratio ranging from 1:9 to 9:1 (Japanese Patent Public Disclosure No. 46913/1977), a green emitting fluorescent composition comprising ZnO and a green emitting phosphor selected from the group consisting of $(Zn_{1-b},Cd_b)S:Cu,Al$, $Y_3(Al_{1-a},Ga_a)_5O_{12}:Ce$, $Zn_2SiO_4:Mn$, $(La_{1-x},Y_x)_2O_2S:Tb$ and mixtures thereof in a mixing weight ratio ranging from 1:9 to 9:1 (Japanese Patent Application Laid Open No. 104481/1972), a red emitting fluorescent composition comprising $In_2O_3$ and a red emitting phosphor selected from the following group in a mixing weight ratio ranging from 1:9 to 9:1, said group consisting of an europium activated yttrium oxysulfide phosphor ($Y_2O_2S:Eu$), an europium activated yttrium oxide phosphor ($Y_2O_3:Eu$), an europium activated yttrium vanadate phosphor ($YVO_4:Eu$) and mixtures thereof (Japanese Patent Public Disclosure No. 23916/1977), and a red emitting fluorescent composition comprising ZnO and a red emitting phosphor selected from the group consisting of $Y_2O_2S:Eu$, $Y_2O_3:Eu$, $YVO_4:Eu$ and mixtures thereof in a mixing weight ratio ranging from 1:9 to 9:1 (Japanese Patent Application Laid Open No. 145479/1976).

Although the above-mentioned blue, green and red emitting fluorescent compositions emit blue, green and red light of high luminance under low-velocity electron excitation occurring under acceleration potential below 1 KV, particularly below 100 V, further improvement of the luminance of the light emitted from these fluorescent compositions is presently desired from the viewpoint of practical use thereof. Further, phosphors which can emit yellow light of high luminance under low-velocity electron excitation occurring under acceleration potential below 1 KV, particularly below 100 V are demanded as the practical use of fluorescent display device increases. However, such yellow emitting phosphors have not heretofore been known.

SUMMARY OF THE INVENTION

First object of the present invention is to provide fluorescent compositions which can emit light of high luminance under low-velocity electron excitation occurring under acceleration potential below 1 KV, particularly below 100 V.

Another first object of the present invention is to provide blue emitting fluorescent compositions which can emit blue light of higher luminance under low-velocity electron excitation occurring under acceleration potential below 1 KV, particularly below 100 V.

Still another first object of the present invention is to provide green emitting fluorescent compositions which can emit green light of higher luminance under low-velocity electron excitation occurring under acceleration potential below 1 KV, particularly below 100 V.

Still another first object of the present invention is to provide red emitting fluorescent compositions which can emit red light of higher luminance under low-velocity electron excitation occurring under acceleration potential below 1 KV, particularly below 100 V.

Still another first object of the present invention is to provide novel yellow emitting fluorescent compositions which can emit yellow light under low-velocity electron excitation occurring under acceleration potential below 1 KV, particularly below 100 V.

Second object of the present invention is to provide fluorescent display devices which can emit light of high luminance.

Another second object of the present invention is to provide blue emitting fluorescent display devices which can emit blue light of higher, luminance.

Still another second object of the present invention is to provide green emitting fluorescent display devices which can emit green light of higher luminance.

Still another object of the present invention is to provide red emitting fluorescent display devices which can emit red light of higher luminance.

Still another object of the present invention is to provide novel yellow emitting fluorescent display devices which can emit yellow light of high luminance.

Other objects of the present invention will become apparent from a consideration of the following description and examples.

The inventors of the present invention conducted various investigations to improve the luminance of the light emitted from the above-mentioned known blue, green and red emitting fluorescent compositions. As the result of the investigations, it was found that when $In_2O_3$ or ZnO having a specific particle diameter distribution was used in a specific mixing ratio, blue, green and red emitting fluorescent compositions which could emit blue, green and red light of higher luminance could be obtained. Further, it was found that the same effect could also be obtained when a conductive metal oxide such as stannic oxide ($SnO_2$), titanium dioride ($TiO_2$), tungsten oxide ($WO_3$), niobium pentoxide ($Nb_2O_5$), etc. or a conductive metal sulfide such as cadmium sulfide (CdS), copper sulfide ($Cu_2S$), etc. was used instead of $In_2O_3$ or ZnO. Furthermore, it was found that the same effect could also be obtained when the following blue, green and red phosphors were respectively used instead of the above-mentioned blue, green and red phosphors which were another components of the above-mentioned known blue, green and red emitting fluorescent compositions;

said blue emitting phosphor being selected from the group consisting of a silver and aluminium activated zinc sulfide phosphor (ZnS:Ag,Al), a cerium activated yttrium silicate phosphor ($Y_2SiO_5$:Ce), an europium activated barium magnesium aluminate phosphor [$(Ba,Mg)O_2.6Al_2O_3$:$Eu^{2+}$], a cerium activated calcium magnesium silicate phosphor ($Ca_2MgSiO_5$:Ce), a silver activated zinc sulfoselenide phosphor [Zn(S,Se):Ag], a silver and aluminium activated zinc sulfoselenide phosphor [Zn(S,Se):Ag,Al], a cerium activated strontium gallium sulfide phosphor ($SrGa_2S_4$:Ce), a titanium activated calcium magnesium silicate phosphor [$(Ca,Mg)_2SiO_4$:Ti], an europium activated strontium barium phosphate phosphor [$(Sr,Ba)_3(PO_4)_2$:$Eu^{2+}$], an europium activated calcium chloroborate phosphor ($Ca_2B_5O_9Cl$:$Eu^{2+}$) and mixtures thereof, said green emitting phosphor being selected from the group consisting of a manganese and arsenic activated zinc silicate phosphor ($Zn_2SiO_4$:Mn,As), a copper activated zinc cadmium sulfide phosphor [$(Zn_{1-c},Cd_c)S$:Cu, wherein c is $0 \leq c \leq 0.1$], a silver activated zinc cadmium sulfide phosphor [$(Zn_{1-d},Cd_d)S$:Ag, wherein d is $0.3 \leq d \leq 0.5$], a silver and aluminium activated zinc cadmium sulfide phosphor [$(Zn_{1-e},Cd_e)S$:Ag,Al, wherein e is $0.3 \leq e \leq 0.5$], a terbium activated rare earth oxysulfide phosphor [$Ln_2O_2S$:Tb, wherein Ln is at least one element selected from the group consisting of Y, Gd, Lu and La. The aforesaid $(La_{1-x},Y_x)_2O_2S$:Tb is included in this phosphor] and mixtures thereof, and said red emitting phosphor being selected from the group consisting of an europium activated rare earth oxysulfide phosphor ($Ln_2O_2S$:Eu, wherein Ln has the same definition as described above. The aforesaid $Y_2O_2S$:Eu is included in this phosphor), an europium activated rare earth oxide phosphor ($Ln_2O_3$:Eu, wherein Ln has the same definition as described above, and the aforesaid $Y_2O_3$:Eu is included in this phosphor), an europium activated rare earth vanadate phosphor ($LnVO_4$, wherein Ln has the same definition as described above. The aforesaid $YVO_4$:Eu is included in this phosphor), an europium activated rare earth borate phosphor ($LnBO_3$:Eu, wherein Ln has the same definition as described above), an europium activated rare earth phosphate phosphor ($LnPO_4$:Eu, wherein Ln has the same definition as described above), a silver activated zinc cadmium sulfide phosphor [$(Zn_{1-f},Cd_f)S$:Ag, wherein f is $0.65 \leq f \leq 0.9$], a manganese activated zinc phosphate phosphor [$Zn_3(PO_4)_2$:Mn], a manganese activated cadmium borate phosphor ($Cd_2B_2O_5$:Mn) and mixtures thereof.

Moreover, as the result of the investigations, it was found that the luminance of the emission of the emitting phosphor selected from the following group under low-velocity electron excitation was markedly improved similarly to the cases of the above-mentioned blue, green and red emitting phosphors by mixing thereto the above mentioned conductive metal oxide or conductive metal sulfide having a specific particle size distribution in a specific mixing ratio, said group consisting of a copper activated zinc sulfoselenide phosphor [$Zn(S_{1-g},Se_g)$:Cu, wherein g is $0.05 \leq g \leq 0.6$], a copper and aluminium activated zinc sulfoselenide phosphor [$Zn(S_{1-h},Se_h)$:Cu,Al wherein h is $0.05 \leq h \leq 0.6$], a silver activated zinc cadmium sulfide phosphor [$(Zn_{1-i},Cd_i)S$:Ag, wherein i is $0.5 \leq i \leq 0.7$], a silver and aluminium activated zinc cadmium sulfide phosphor [$(Zn_{1-j},Cd_j)S$:Ag,Al, wherein j is $0.5 \leq j < 0.7$], a gold and aluminium activated zinc cadmium sulfide phosphor [$(Zn_{1-k},Cd_k)S:Au,Al$, wherein k is $0 \leq k \leq 0.2$], a copper activated zinc cadmium sulfide phosphor [$(Zn_{1-l},Cd_l)S:Cu$, wherein l is $0.1 < l \leq 0.2$], a copper and aluminium activated zinc cadmium sulfide phosphor [$(Zn_{1-m},Cd_m)S:Cu,Al$, wherein m is $0.1 < m \leq 0.2$], a lead and manganese activated calcium silicate phosphor ($CaSiO_2:Pb,Mn$) and mixtures thereof.

The fluorescent composition of the present invention is composed of a conductive material selected from the group consisting of a conductive metal oxide, mixtures of more than one kind of conductive metal oxide, a conductive metal sulfide, mixtures of more than one kind of conductive metal sulfide and mixtures thereof, said conductive material has a particle diameter distribution wherein central value is within the range of 2.5 to 14µ and standard deviation (log $\sigma$) is not more than 0.7, and a phosphor selected from the group consisting of a blue emitting phosphor, a green emitting phosphor, a red emitting phosphor and a yellow emitting phosphor in a mixing weight ratio ranging from 1:99 to 1:4, said blue emitting phosphor being selected from the group consisting of $ZnS:Ag$, $ZnS:Ag,Al$, $Zn(S,Se):Ag$, $Zn(S,Se):Ag,Al$, $Y_2SiO_5:Ce$, $SrGa_2S_4:Ce$, $Ca_2MgSiO_5:Ce$, $(Ca,Mg)_2SiO_4:Ti$, $(Ba,Mg)O_2.6Al_2O_3:Eu^{2+}$, $(Sr,Ba)_3(PO_4)_2:Eu^{2+}$, $Ca_2B_5O_9Cl:Eu^{2+}$ and the mixtures thereof, said green emitting phosphor being selected from the group consisting of $Zn_2SiO_4:Mn$, $Zn_2SiO_4:Mn,As$, $Ln_2O_2S:Tb$, $Y_3(Al_{1-a},Ga_a)_5O_{12}:Ce$, $SrGa_2S_4:Eu^{2+}$, $(Zn_{1-b},Cd_b)S:Cu,Al$, $(Zn_{1-c},Cd_c)S:Cu$, $(Zn_{1-d},Cd_d)S:Ag$, $(Zn_{1-e},Cd_e)S:Ag,Al$ and mixtures thereof, said red emitting phosphor being selected from the group consisting of $Ln_2O_2S:Eu$, $Ln_2O_3:Eu$, $LnVO_4:Eu$, $LnBO_3:Eu$, $LnPO_4:Eu$, $(Zn_{1-f},Cd_f)S:Ag$, $Zn_3(PO_4)_2:Mn$, $Cd_2B_2O_5:Mn$ and mixtures thereof, and said yellow emitting phosphor being selected from the group consisting of $Zn(S_{1-g},Se_g):Cu$, $Zn(S_{1-h},Se_h):Cu,Al$, $(Zn_{1-i},Cd_i)S:Ag$, $(Zn_{1-j},Cd_j)S:Ag,Al$, $(Zn_{1-k},Cd_k)S:Au,Al$, $(Zn_{1-l},Cd_l)S:Cu$, $(Zn_{1-m},Cd_m)S:Cu,Al$, $CaSiO_3:Pb,Mn$ and mixture thereof.

Further, the fluorescent display device of the present invention has the above-mentioned fluorescent composition of the present invention as a component of a fluorescent screen.

BRIEF DESCRIPTION OF THE DRAWINGS

FIGS. 4A to 4D are graphs showing the relationships between the central value of the particle diameter of $In_2O_3$ and the maximum luminance of emission in the fluorescent compositions employing $In_2O_3$ as a conductive material.

DETAILED DESCRIPTION OF THE INVENTION

Figure 1:
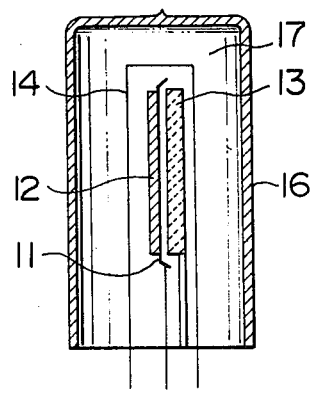
FIG. 1 and FIG. 2 are structural outlines of typical examples of fluorescent display devices wherein a diode type display tube is shown in FIG. 1 and a triode type display tube is shown in FIG. 2, FIGS. 3A to 3D are graphs showing the relationships between the $In_2O_3$ content (weight %) and the luminance of emission in the fluorescent compositions employing $In_2O_3$ as a conductive material.

All the fluorescent compositions of the present invention which contain compositions capable of emitting blue, green, red or yellow light under low-velocity electron excitation are characterized by containing as an essential component a conductive material which is selected from the following group and which has a particle diameter distribution wherein central value is within the range of 2.5 to 14µ and standard deviation (log $\sigma$) is not more than 0.7, said group consisting of a conductive metal oxide, mixtures of more than one kind of conductive metal oxide, a conductive metal sulfide, mixtures of more than one kind of conductive metal sulfide and mixtures thereof.

The conductive metal oxides and the conductive metal sulfides capable of being employed as the conductive material which is one of the components of the fluorescent composition of the present invention include $In_2O_3$, $ZnO$, $SnO_2$, $TiO_2$, $WO_3$, $Nb_2O_5$, etc. and $CdS$, $Cu_2S$, etc., respectively. In particular, it is preferable to employ the conductive metal oxide from the viewpoint of luminance of emission of the fluorescent composition obtained. Among the conductive metal oxide, $In_2O_3$, $SnO_2$ and $ZnO$ are particularly preferable.

These conductive metal oxides and conductive metal sulfides should have such a particle diameter distribution that central value is within the range of 2.5 to 14µ and standard deviation is not more than 0.7. A conductive material having a particle diameter distribution wherein central value is not within the above range and standard deviation is more than 0.7 cannot be employed since the luminance of emission of the fluorescent composition obtained becomes low. Preferable central value depends on the kind of the conductive material, the kind of the phosphor which is mixed with the conductive material and so forth. In general, preferable central value is within the range of 3 to 10µ. The standard deviation is preferably as small as possible when the central value is constant. In general, the standard deviation is preferably not more than 0.5.

The conductive metal oxide and the conductive metal sulfide which have the above-mentioned particle diameter distribution can respectively be obtained by classifying a commercially available reagent grade conductive metal oxide and a commercially available reagent grade conductive metal sulfide by levigation or the like as they are or after they are milled by means of a ball mill, roll mill or the like. Also, the conductive metal oxide and the conductive metal sulfide employed in the present invention can respectively be obtained by firing the reagent grade conductive metal oxide and the reagent grade conductive metal sulfide in an air, a neutral atmosphere or a weak-reducing atmosphere to obtain fired products, and then classifying the fired products as they are or after they are milled. Further, the conductive metal oxide employed in the present invention can also be obtained by firing a compound of the kind which can easily be converted to a conductive metal oxide at high temperature such as a carbonate, a sulfate, an oxalate, a hydroxide, etc. in an air to obtain the conductive metal oxide, and then classifying the conductive metal oxide as it is or after it is milled. The reason for using the fired conductive materials is that the fired conductive materials are more chemically stable and according provide fluorescent compositions which emit light of higher luminance than unfired conductive materials. Generally, the conductivity of the conductive metal sulfide is markedly enhanced by firing. Therefore, it is preferred to use the fired conductive metal sulfide when using the conductive metal sulfide.

On the other hand, phosphor (1) having the formula [$ZnS:Ag$], phosphor (2) [$ZnS:Ag,Al$], phosphor (3)

[Zn(S,Se):Ag], phosphor (4) [Zn(S,Se):Ag,Al], phosphor (5) [Y$_2$SiO$_5$:Ce], phosphor (6) [SrGa$_2$S$_4$:Ce], phosphor (7) [Ca$_2$MgSiO$_5$:Ce], phosphor (8) [(Ca,Mg)$_2$SiO$_4$:Ti], phosphor (9) [(Ba,Mg)O$_2$.6Al$_2$O$_3$:Eu$^{2+}$], phosphor (10) [(Sr,Ba)$_3$(PO$_4$)$_2$:Eu$^{2+}$], phosphor (11) [Ca$_2$B$_5$O$_9$Cl:Eu$^{2+}$], phosphor (12) [Zn$_2$SiO$_4$:Mn], phosphor (13) [Zn$_2$SiO$_4$:Mn,As], phosphor (14) [Ln$_2$O$_2$S:Tb], phosphor (15) [Y$_3$(Al$_{1-a}$,Ga$_a$)$_5$O$_{12}$:Ce], phosphor (16) [SrGa$_2$S$_4$:Eu$^{2+}$], phosphor (17) [(Zn$_{1-b}$,Cd$_b$)S:Cu,Al], phosphor (18) [(Zn$_{1-c}$,Cd$_c$)S:Cu], phosphor (19) [(Zn$_{1-d}$,Cd$_d$)S:Ag], phosphor (20) [(Zn$_{1-e}$,Cd$_e$)S:Ag,Al], phosphor (21) [Ln$_2$O$_2$S:Eu], phosphor (22) [Ln$_2$O$_3$:Eu], phosphor (23) [LnVO$_4$:Eu], phosphor (24) [LnBO$_3$:Eu], phosphor (25) [LnPO$_4$:Eu], phosphor (26) [(Zn$_{1-f}$,Cd$_f$)S:Ag], phosphor (27) [Zn$_3$(PO$_4$)$_2$:Mn], phosphor (28) [Cd$_2$B$_2$O$_5$:Mn], phosphor (29) [Zn(S$_{1-g}$,Se$_g$)S:Cu], phosphor (30) [Zn(S$_{1-h}$,Se$_h$)S:Cu,Al], phosphor (31) [(Zn$_{1-i}$,Cd$_i$)S:Ag], phosphor (32) [(Zn$_{1-j}$,Cd$_j$)S:Ag,Al], phosphor (33) [(Zn$_{1-k}$,Cd$_k$)S:Au,Al], phosphor (34) [(Zn$_{1-l}$,Cd$_l$)S:Cu], phosphor (35) [(Zn$_{1-m}$,Cd$_m$)S:Cu,Al] and phosphor (36) [CaSiO$_3$:Pb,Mn] which are employed as the other component of the fluorescent composition of the present invention can be prepared in accordance with the conventional well known process. These phosphors generally have a particle diameter distribution wherein central value is within the range of 1 to 20$\mu$ and standard deviation is not more than 0.7. The phosphors having a central value ranging from 3 to 10$\mu$ are particularly preferable in the present invention. The above-mentioned phosphors (1) to (11), phosphors (12) to (20), phosphors (21) to (28) and phosphors (29) to (36) are blue, green, red and yellow emitting phosphors, respectively. Among the blue emitting phosphors, phosphors (1) to (4) are preferably employed from the viewpoint of luminance of emission of the fluorescent composition obtained, and more preferably phosphors (1) and (2) are employed. Similarly, among the green emitting phosphors, phosphors (16), (17) and (19) are preferably employed, and more preferbly phosphor (17) is employed. Further, among the red emitting phosphors, Y$_2$O$_2$S:Eu [included in phosphor (21)], YVO$_4$:Eu [included in phosphor (23)], YBO$_3$:Eu [included in phosphor (24)] and phosphor (28) are preferably employed, and more preferably Y$_2$O$_2$S:Eu and YBO$_3$:Eu are employed. Further, among the yellow emitting phosphors, phosphors (29), (31), (32), (34) and (35) are preferably employed, and more preferably phosphors (29) and (31) are employed. Phosphors (1), (3), (18), (19), (26), (29), (31) and (34) which further contain a very small amount of Cl and phosphors (21) to (25) which are coactivated with Tb can also be employed.

The fluorescent composition of the present invention can be produced by mechanically mixing the above-mentioned conductive material and at least one of phosphors (1) to (11), at least one of phosphors (12) to (20), at least one of phosphors (21) to (28) or at least one of phosphors (29) to (36). The mixing process may be carried out by use of the conventional mixing instrument such as a mortar, a ball mill, a mixer mill or the like. The two components are mixed in a weight ratio of the amount of conductive material to that of phosphor ranging from 1/99 to ¼. When the conductive material is present in an amount under the mixing weight ratio of 1/99 (when the amount of the conductive material is smaller than 1 weight% of the fluorescent composition), the charge-up phenomenon of the phosphor can not be prevented by the conductive material and accordingly, the characteristics of the resulting composition are akin to those of the phosphor used. Therefore, substantially no emission is observed under low-velocity electron excitation. On the other hand, when the conductive material is present in an amount in excess of the mixing weight ratio of ¼ (when the amount of the conductive material is larger than 20 weight% of the fluorescent composition), the resulting composition gives rise to very weak emission. This is because the light emitted from the phosphor is intercepted by the conductive material, though the charge-up phenomenon is prevented sufficiently. In general, the mixing weight ratio is preferably within the range of 3/197 to 1/9 (the amount of the conductive material is within the range of 1.5 to 10 weight% of the fluorescent composition) from the viewpoint of the luminance of the fluorescent composition obtained. Of the fluorescent compositions proposed in the present invention, those compositions containing phosphors (1) to (11) emit blue light, those compositions containing phosphors (12) to (20) emit green light, those compositions containing phosphors (21) to (28) emit red light and those compositions containing phosphors (29) to (36) emit yellow light. In the fluorescent composition of the present invention, preferable combinations of the conductive material and the blue emitting phosphor are In$_2$O$_3$ and phosphor (3), In$_2$O$_3$ and phosphor (1), SnO$_2$ and phosphor (1), and In$_2$O$_3$ and phosphor (2). Moreover, preferable combinations of the conductive material and the green emitting phosphor are In$_2$O$_3$ and phosphor (17), SnO$_2$ and phosphor (17), In$_2$O$_3$ and phosphor (16), and In$_2$O$_3$ and phosphor (19). Moreover, preferable combinations of the conductive material and the red emitting phosphor are In$_2$O$_3$ and Y$_2$O$_2$S:Eu [included in phosphor (21)], SnO$_2$ and Y$_2$O$_2$S:Eu, and In$_2$O$_3$ and YBO$_3$:Eu [included in phosphor (24)]. Moreover, preferable combinations of the conductive material and the yellow emitting phosphor are In$_2$O$_3$ and phosphor (29), and In$_2$O$_3$ and phosphor (31). The fluorescent compositions of these combinations particularly emit light of high luminance.

FIGS. 3A to 3D show the relationships between the In$_2$O$_3$ content (weight%) and the luminance of emission in the fluorescent compositions employing In$_2$O$_3$ as a conductive material. FIGS. 3A to 3D show the results obtained when phosphor (1), (Zn$_{0.95}$,Cd$_{0.05}$)S:Cu,Al [included in phosphor (17)], Y$_2$O$_2$S:Eu [included in phosphor (21)] and Zn(S$_{0.75}$,Se$_{0.25}$):Cu [included in phosphor (29)] were employed, respectively. In each of FIGS. 3A to 3D, curves a, b and c show the results when three kinds of In$_2$O$_3$ having the same standard deviations of 0.4 and having central values of 4.5$\mu$, 8$\mu$ and 20$\mu$, respectively, were employed. Also, in each of FIGS. 3A to 3D, the luminance is represented by the relative value to the maximum luminance of curve c defined to be 100%.

As is clear from the FIGS. 3A to 3D, the In$_2$O$_3$ content required to obtain maximum luminance becomes small as the central value of In$_2$O$_3$ becomes small. That is, when In$_2$O$_3$ having a smaller central value is employed, an emission of high luminance can be attained by using a smaller amount of In$_2$O$_3$ in comparison with the case wherein In$_2$O$_3$ having a larger central value. Further, as is clear from FIGS. 3A to 3D, maximum luminance becomes higher as the central value of In$_2$O$_3$ becomes small. However, as shown in FIGS. 4A to 4D, the maximum luminance conversely becomes low when the central value becomes still smaller.

FIGS. 4A to 4D show the relationships between the central value of $In_2O_3$ and the maximum luminance of the fluorescent compositions in the fluorescent compositions employing $In_2O_3$ as a conductive material. Similarly to FIGS. 3A to 3D, FIGS. 4A to 4D show the results obtained when phosphor (1), $(Zn_{0.95},Cd_{0.05})S:Cu,Al$ [included in phosphor (17)], $Y_2O_2S:Eu$ [included in phosphor (21)] and $Zn(S_{0.75}, Se_{0.25}):Cu$ [included in phosphor (29)] were employed, respectively. In each of FIGS. 4A to 4D, the standard deviation of the $In_2O_3$ employed is constant ($\sigma=0.4$), and the maximum luminance is represented by the relative value to the maximum luminance of the fluorescent composition in which $In_2O_3$ having the central value of $20\mu$ is employed defined to be 100%.

As is clear from FIGS. 4A to 4D, when the central value is larger than about $4.5\mu$, the smaller the central value becomes, the higher the maximum luminance becomes, and the maximum luminance reaches maximum when the central value is about $4.5\mu$. Conversely, when the central value is smaller than about $4.5\mu$, the maximum luminance becomes low as the central value becomes small. In general, commercially available reagent grade $In_2O_3$ has a central value ranging from 20 to $30\mu$, and the fluorescent composition which exhibits emission of higher luminance than the fluorescent composition employing the commercially available reagent grade $In_2O_3$ can be obtained only by employing the $In_2O_3$ having the central value ranging from 2.5 to $14\mu$. In particular, the fluorescent composition which exhibits emission of markedly high luminance can be obtained by employing the $In_2O_3$ having the central value ranging from 3 to $10\mu$.

Further, the luminance of the fluorescent composition also depends upon the standard deviation of the $In_2O_3$ employed. That is, when the central value is within the above-mentioned range, the luminance generally becomes low as the standard deviation becomes large. This is because $In_2O_3$ contains a larger amount of large particles and small particles none of which contribute to elevation of the luminance as the standard deviation becomes large. In view of this observation, the standard deviation is decided to be not more than 0.7. The standard deviation is preferably not more than 0.5.

Although both FIGS. 3A to 3D and FIGS. 4A to 4D are the graphs concerning the four kinds of fluorescent compositions, that is, the composition comprising $In_2O_3$ and phosphor (1), the compositions comprising $In_2O_3$ and phosphor (17), the compositions comprising $In_2O_3$ and phosphor (21) and the compositions comprising $In_2O_3$ and phosphor (29), similar results were obtained when other conductive metal oxides or conductive metal sulfides are employed instead of $In_2O_3$, or when other phosphors are employed instead of phosphors (1), (17), (21) and (29). In view of the above-mentioned observations, the conductive metal oxide and the conductive metal sulfide which can be employed in the fluorescent composition are limited to those having such a particle diameter distribution that central value is within the range of 2.5 to $14\mu$ and standard deviation is not more than 0.7, and the mixing weight ratio of the conductive material to the phosphor of the fluorescent composition of the present invention is limited to the range of 1:99 to 1:4.

The fluorescent display device of the present invention is manufactured in accordance with the following process.

First, an anodic plate supported by a conventional ceramic base plate is coated with the above-mentioned fluorescent composition in accordance with the sedimentation coating method in order to make a fluorescent screen. That is, an anodic plate is placed in an aqueous dispersion of the fluorescent composition and the fluorescent composition is allowed to deposit on one side of the anodic plate as it settles because of its own weight, and then the water is removed from the aqueous dispersion. The resulting coating is then dried. In such a process, a small amount of water glass (about 0.01 to about 1%) may be added to the aforesaid dispersion for the purpose of increasing the adhesive property of the resulting fluorescent screen to the anodic plate. The preferred amount of the fluorescent composition applied to the anodic plate is within the range of about 1 $mg/cm^2$ to about 30 $mg/cm^2$.

The above-mentioned sedimentation coating method has been commonly and widely applied in making fluorescent screens. However, the method for making a fluorescent screen in accordance with the present invention is not to be interpreted as being limited to the above-mentioned sedimentation coating method.

Next, a cathode made of a wire-heater covered with an oxide such as BaO, SrO, CaO or the like is placed opposite the fluorescent screen on the anodic plate at an interval of about 1 to 5 mm, and then the resulting pair of electrodes is set in a transparent container made of glass or the like and air present in the container is evacuated. After the pressure inside this container reaches a pressure of $10^{-5}$ Torr or less, the evacuation is stopped and the resulting container is additionally reduced by sputtering a getter. In accordance with the process described above, the fluorescent display device can be obtained.

Figure 2:
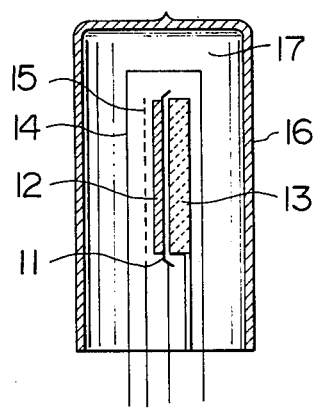
Figure 3A:
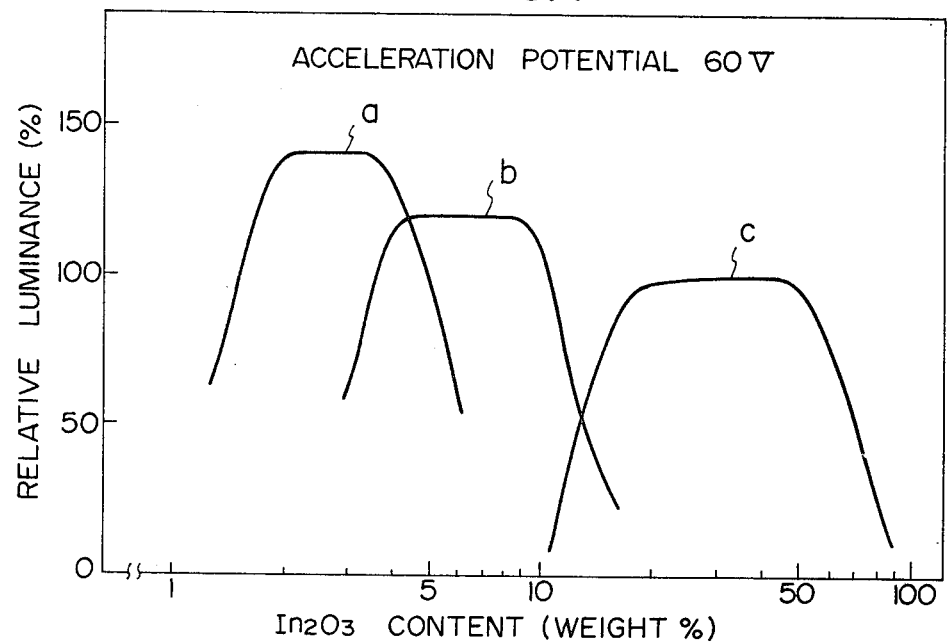
Figure 3B:
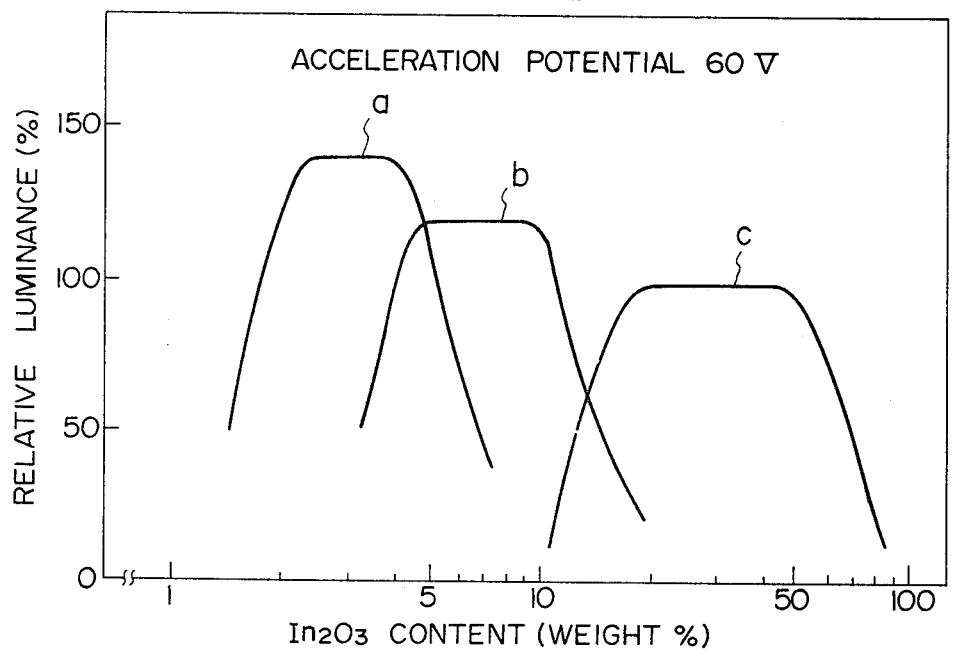

Further, as shown in FIG. 2, it is desirable to place a mesh-like control grid between the cathode and the fluorescent screen to function as a diverging electrode. Such an electrode is useful in diverging low-velocity electrons emitted from the cathode because the fluorescent screen on the anodic plate is flat while the cathode is a wire. In this case, better results are attained by using a mesh as fine as possible since a smaller mesh results in a smaller loss in emission of the fluorescent screen and in better efficiency in the divergence of low-velocity electrons. Specifically, meshes of below 500 micron and having an aperture ratio of not less than 50% are preferred. (Where the aperture ratio refers to the area of the holes capable of passing low-velocity electrons divided by the total area of the grid). A character, number or pattern can be displayed by cutting the anodic plate in the form of the character, number or pattern to be displayed and selectively applying an acceleration potential suitable for the particular pair of separated anodes. Moreover, multicolor fluorescent display devices can be obtained by cutting the anodic plate into a desired form, e.g., the form of an array of dots or lines, applying a fluorescent screen comprising a first fluorescent composition onto some portions of the separated anode, and applying onto other portions of the anode a fluorescent screen comprising a second fluorescent composition which, under low-velocity electron excitation, can emit light of a color different from that of the first fluorescent composition.

As is described hereinbefore, in accordance with the present invention, it is possible to provide fluorescent compositions which can emit blue, green or red light of higher luminance under low-velocity electron excitation occurring under acceleration potential below 1 KV, particularly below 100 V. It is also possible to provide fluorescent display devices having the aforesaid fluorescent compositions as fluorescent screens which can emit blue, green or red light.

Further, in accordance with the present invention, it is possible to provide novel fluorescent compositions which can emit yellow light of high luminance under low-velocity electron excitation occurring under acceleration potential below 1 KV, particularly below 100 V. It is also possible to provide fluorescent display devices having the aforesaid fluorescent composition as fluorescent screens which can emit yellow light.

The present invention will now be described in detail by reference to the following examples.

EXAMPLE 1

Commercially available reagent grade $In_2O_3$ (manufactured by Hikotaro Shudzui Co., Ltd.) was milled and then classified by levigation to obtain $In_2O_3$ having a particle diameter distribution wherein central value is $8\mu$ and standard deviation is 0.4. 7 grams of this $In_2O_3$ and 93 grams of ZnS:Ag [phosphor (1)] having a particle diameter distribution wherein central value is $7\mu$ and standard deviation is 0.35 which was prepared by the conventional process were mixed well by using a mortar. 100 mg of the resulting composition were dispersed into 100 ml of distilled water by ultrasonic dispersion method to obtain an aqueous dispersion. A 2 cm×1 cm aluminium anodic plate supported on a ceramic base plate was placed in the aqueous dispersion, and the aqueous dispersion was allowed to stand for 30 minutes. Then, the water was removed from the aqueous dispersion, and the resulting coating was dried to form a fluorescent screen.

Next, a cathode in the form of a tungsten wire heater covered with an oxide was located being faced to the fluorescent screen on the aluminium anodic plate at the interval of about 5 mm. Then, the pair of electrodes was put in a hard glass container and air existing in the container was evacuated. After the pressure inside the container reached $10^{-5}$ Torr or so, the evacuation was stopped and the container was sealed. Then, the pressure inside the evacuated container was further reduced by sputtering a getter. Thus, a fluorescent display device having the structure as shown in FIG. 1 was obtained. The resulting fluorescent display device exhibited blue emission having a luminance of 60 ft-L under an anodic plate potential of 60 V, a cathode potential of 1.2 V and an anodic plate current of 2 $mA/cm^2$.

EXAMPLE 2

Commercially available reagent grade $In_2O_3$ (manufactured by Hikotaro Shudzui Co., Ltd.) was milled and then classified by levigation to obtain $In_2O_3$ having a particle diameter distribution wherein central value is $4.5\mu$ and standard deviation is 0.4. 3 grams of this $In_2O_3$ and 97 grams of ZnS:Ag [phosphor (1)] employed in Example 1 were mixed well by using a mortar to obtain a fluorescent composition. Then, a fluorescent display device was manufactured in the same manner as in Example 1. The fluorescent display device obtained exhibited blue emission having a luminance of 70 ft-L under an anodic plate potential of 60 V, cathode potential of 1.2 V and an anodic plate current of 2 $mA/cm^2$.

EXAMPLE 3

Commercially available reagent grade $SnO_2$ (manufactured by Hikotaro Shudzui Co., Ltd.) was milled and then classified by levigation to obtain $SnO_2$ having a particle diameter distribution wherein central value is $8\mu$ and standard deviation is 0.4. 7 grams of this $SnO_2$ and 93 grams of ZnS:Ag [phosphor (1)] employed in Example 1 were mixed well by using a mortar to obtain a fluorescent composition. Then, a fluorescent display device was manufactured in the same manner as in Example 1. The fluorescent display device obtained exhibited blue emission having a luminance of 70 ft-L under an anodic plate potential of 60 V, a cathode potential of 1.2 V and an anodic plate current of 2 $mA/cm^2$.

EXAMPLE 4

Commercially available reagent grade $In_2O_3$ (manufactured by Hikotaro Shudzui Co., Ltd.) was milled and then classified by levigation to obtain $In_2O_3$ having a particle diameter distribution wherein central value is $8\mu$ and standard deviation is 0.4. 7 grams of this $In_2O_3$ and 93 grams of $(Zn_{0.95}, Dc_{0.05})S:Cu,Al$ [included in phosphor (17)] having a particle diameter wherein central value is $7\mu$ and standard deviation is 0.35 which was prepared by the conventional process were mixed well by using a mortar to obtain a fluorescent composition. Then, a fluorescent display device was manufactured in the same manner as in Example 1. The fluorescent display device obtained exhibited green emission having a luminance of 200 ft-L under an anodic plate potential of 60 V, a cathode potential of 1.2 V and an anodic plate current of 2 $mA/cm^2$.

EXAMPLE 5

Commercially available reagent grade $In_2O_3$ (manufactured by Hikotaro Shudzui Co., Ltd.) was milled and then classified by levigation to obtain $In_2O_3$ having a particle diameter distribution wherein central value is $4.5\mu$ and standard deviation is 0.4. 3 grams of this $In_2O_3$ and 97 grams $(Zn_{0.95}, Cd_{0.05})S:Cu,Al$ [included in phosphor (17)] employed in Example 4 were mixed well by using a mortar to obtain a fluorescent composition. Then, a fluorescent display device was manufactured in the same manner as in Example 1. The fluorescent display device obtained exhibited green emission having a luminance of 235 ft-L under an anodic plate potential of 60 V, a cathode potential of 1.2 V and an anodic plate current of 2 $mA/cm^2$.

EXAMPLE 6

Commercially available reagent grade $SnO_2$ (manufactured by Hikotaro Shudzui Co., Ltd.) was milled and then classified by levigation to obtain $SnO_2$ having a particle diameter distribution wherein central value is $8\mu$ and standard deviation is 0.4. 7 grams of this $SnO_2$ and 93 grams of $(Zn_{0.95}, Cd_{0.05})S:Cu,Al$ [included in phosphor (17)] employed in Example 4 were mixed well by using a mortar to obtain a fluorescent composition. Then, a fluorescent display device was manufactured in the same manner as in Example 1. The fluorescent display device obtained exhibited green emission having a luminance of 180 ft-L under an anodic plate potential of 60 V, a cathode potential of 1.2 V and an anodic plate current of 2 $mA/cm^2$.

EXAMPLE 7

Commercially available reagent grade $In_2O_3$ (manufactured by Hikotaro Shudzui Co., Ltd.) was milled and then classified by levigation to obtain $In_2O_3$ having a particle diameter distribution wherein central value is $8\mu$ and standard deviation is 0.4. 7 grams of this $In_2O_3$ and 93 grams of $Y_2O_2S:E$ [included in phosphor (21)] having a particle diameter wherein central value is $7\mu$ and standard deviation is 0.35 which was prepared by the conventional process were mixed well by using a mortar to obtain a fluorescent composition. Then, a fluorescent display device was manufactured in the same manner as in Example 1. The fluorescent display device obtained exhibited red emission having a luminance of 100 ft-L under an anodic plate potential of 90 V, a cathode potential of 1.2 V and an anodic plate current of 2 $mA/cm^2$.

EXAMPLE 8

Commercially available reagent grade $In_2O_3$ (manufactured by Hikotaro Shudzui Co., Ltd.) was milled and then classified by levigation to obtain $In_2O_3$ having a particle diameter distribution wherein central value is $4.5\mu$ and standard deviation is 0.4. 3 grams of this $In_2O_3$ and 97 grams of $Y_2O_2S:Eu$ [included in phosphor (21)] employed in Example 7 were mixed well by using a mortar to obtain a fluorescent composition. Then, a fluorescent display device was manufactured in the same manner as in Example 1. The fluorescent display device obtained exhibited red emission having a luminance of 117 ft-L under an anodic plate potential of 90 V, a cathode potential of 1.2 V and an anodic plate current of 2 $mA/cm^2$.

EXAMPLE 9

Commercially available reagent grade $SnO_2$ (manufactured by Hikotaro Shudzui Co., Ltd.) was milled and then classified by levigation to obtain $SnO_2$ having a particle diameter distribution wherein central value is $8\mu$ and standard deviation is 0.4. 7 grams of this $SnO_2$ and 93 grams of $Y_2O_2S:Eu$ [included in phosphor (21)] employed in Example 7 were mixed well by using a mortar to obtain a fluorescent composition. Then, a fluorescent display device was manufactured in the same manner as in Example 1. The fluorescent display device obtained exhibited red emission having a luminance of 90 ft-L uner an anodic plate potential of 90 V, a cathode potential of 1.2 V and an anodic plate current of 2 $mA/cm^2$.

EXAMPLE 10

Commercially available reagent grade $In_2O_3$ (manufactured by Hikotaro Shudzui Co., Ltd.) was milled and then classified by levigation to obtain $In_2O_3$ having a particle diameter distribution wherein central value is $8\mu$ and standard deviation is 0.4. 7 grams of this $In_2O_3$ and 93 grams of $Zn(S_{0.75},Se_{0.25}):Cu$ [included in phosphor (29)] having a particle diameter wherein central value is $7\mu$ and standard deviation is 0.35 which was prepared by the conventional process were mixed well by using a mortar to obtain a fluorescent composition. Then, a fluorescent display device was manufactured in the same manner as in Example 1. The fluorescent display device obtained exhibited yellow emission having a luminance of 240 ft-L under an anodic plate potential of 60 V, a cathode potential of 1.2 V and an anodic plate current of 2 $mA/cm^2$.

EXAMPLE 11

Commercially available reagent grade $In_2O_3$ (manufactured by Hikotaro Shudzui Co., Ltd.) was milled and then classified by levigation to obtain $In_2O_3$ having a particle diameter distribution wherein central value is $4.5\mu$ and standard deviation is 0.4. 3 grams of this $In_2O_3$ and 97 grams of $Zn(S_{0.75},Se_{0.25}):Cu$ [included in phosphor (29)] employed in Example 10 were mixed well by using a mortar to obtain a fluorescent composition. Then, a fluorescent display device was manufactured in the same manner as in Example 1. The fluorescent display device obtained exhibited yellow emission having a luminance of 280 ft-L under an anodic plate potential of 60 V, a cathode potential of 1.2 V and an anodic plate current of 2 $mA/cm^2$.

EXAMPLE 12

Commercially available reagent grade $SnO_2$ (manufactured by Hikotaro Shudzui Co., Ltd.) was milled and then classified by levigation to obtain $SnO_2$ having a particle diameter distribution wherein central value is $8\mu$ and standard deviation is 0.4. 7 grams of this $SnO_2$ and 93 grams of $Zn(S_{0.75},Se_{0.25}):Cu$ [included in phosphor (29)] employed in Example 10 were mixed well by using a mortar to obtain a fluorescent composition. Then, a fluorescent display device was manufactured in the same manner as in Example 1. The fluorescent display device obtained exhibited yellow emission having a luminance of 250 ft-L under an anodic plate potential of 60 V, a cathode potential of 1.2 V and an anodic plate current of 2 $mA/cm^2$.

We claim:

1. A low-velocity electron excited fluorescent display device comprising a sealed evacuated tube, an anodic plate enclosed in said tube having a fluorescent screen on one side thereof, and a cathode enclosed in said tube standing face to face with said fluorescent screen and emitting electrons which impinge upon said fluorescent screen and excite said fluorescent screen, wherein said fluorescent screen is composed of a fluorescent composition consisting essentially of a mechanical mixture of a conductive material selected from the group consisting of indium oxide ($In_2O_3$), zinc oxide (ZnO), stannic oxide ($SnO_2$), titanium dioxide ($TiO_2$), tungsten oxide ($WO_3$), niobium pentoxide ($Nb_2O_5$), cadmium sulfide (CdS), copper sulfide ($Cu_2S$) and mixtures thereof, said conductive material having a particle diameter distribution wherein the median value is within the range of 2.5 to $14\mu$ and standard deviation (log $\sigma$) is not more than 0.7, and a phosphor selected from the group consisting of a blue emitting phosphor, a green emitting phosphor, a red emitting phosphor and a yellow emitting phosphor in a mixing weight ratio ranging from 1:99 to 1:4, said blue emitting phosphor being selected from the group consisting of a silver activated zinc sulfide phosphor (ZnS:Ag), a silver and aluminium activated zinc sulfide phosphor (ZnS:Ag,Al), a silver activated zinc sulfoselenide phosphor [Zn(S,Se):Ag], a silver and aluminium activated zinc sulfoselenide phosphor [Zn(S,Se):Ag,Al], a cerium activated yttrium silicate phosphor ($Y_2SiO_5$:Ce), a cerium activated strontium gallium sulfide phosphor ($SrGa_2S_4$:Ce), a cerium activated calcium magnesium silicate phosphor ($Ca_2MgSiO_5$:Ce), a titanium activated calcium magnesium phosphor

[(Ca,Mg)$_2$SiO$_4$:Ti], an europium activated barium magnesium aluminate phosphor [(Ba,Mg)O$_2$.6Al$_2$O$_3$:Eu$^{2+}$], an europium activated strontium barium phosphate phosphor, [(Sr,Ba)$_3$(PO$_4$)$_2$:Eu$^{2+}$], an europium activated calcium chloroborate phosphor (Ca$_2$B$_5$O$_9$Cl:Eu$^{2+}$) and mixtures thereof, said green emitting phosphor being selected from the group consisting of a manganese activated zinc silicate phosphor (Zn$_2$SiO$_4$:Mn), a manganese and arsenic activated zinc silicate phosphor (Zn$_2$SiO$_4$:Mn,As), a terbium activated rare earth oxysulfide phosphor (Ln$_2$O$_2$S:Tb, wherein Ln is at least one element selected from the group consisting of Y, Gd, Lu and La), a cerium activated yttrium aluminium gallium oxide phosphor [Y$_3$(Al$_{1-a}$,Ga$_a$)$_5$O$_{12}$:Ce, wherein a is $0 \leq a \leq 0.5$], an europium activated strontium gallium sulfide phosphor (SrGa$_2$S$_4$:Eu$^{2+}$), a copper and aluminium activated zinc cadmium sulfide phosphor [(Zn$_{1-b}$,Cd$_b$)S:Cu,Al, wherein b is $0 \leq b \leq 0.1$], a copper activated zinc cadmium sulfide phosphor [(Zn$_{1-c}$,Cd$_c$)S:Cu, wherein c is $0 \leq c \leq 0.1$], a silver activated zinc cadmium sulfide phosphor [(Zn$_{1-d}$,Cd$_d$)S:Ag, wherein d is $0.3 \leq d \leq 0.5$], a silver and aluminium activated zinc cadmium sulfide phosphor [(Zn$_{1-e}$,Cd$_e$)S:Ag,Al, wherein e is $0.2 \leq e \leq 0.5$] and mixtures thereof, said red emitting phosphor being selected from the group consisting of an europium activated rare earth oxysulfide phosphor (Ln$_2$O$_2$S:Eu, wherein Ln has the same definition as described above), an europium activated rare earth oxide phosphor (Ln$_2$O$_3$:Eu, wherein Ln has the same definition as described above), an europium activated rare earth vanadate phosphor (LnVO$_4$:Eu, wherein Ln has the same definition as described above), an europium activated rare earth borate phosphor (LnBO$_3$:Eu, wherein Ln has the same definition as described above), an europium activated rare earth phosphate phosphor (LnPO$_4$:Eu, wherein Ln has the same definition as described above), a silver activated zinc cadmium sulfide phosphor [(Zn$_{1-f}$,Cd$_f$)S:Ag, wherein f is $0.65 \leq f \leq 0.9$], a manganese activated zinc phosphate phosphor [Zn$_3$(PO$_4$)$_2$:Mn], a manganese activated cadmium borate phosphor (Cd$_2$B$_2$O$_5$:Mn) and mixtures thereof, and said yellow emitting phosphor being selected from the group consisting of a copper activated zinc sulfoselenide phosphor [Zn(S$_{1-g}$,Se$_g$):Cu, wherein g is $0.05 \leq g \leq 0.6$], a copper and aluminium activated zinc sulfoselenide phosphor [Zn(S$_{1-h}$,Se$_h$):Cu,Al, wherein h is $0.05 \leq h \leq 0.6$], a silver activated zinc cadmium sulfide phosphor [(Zn$_{1-i}$,Cd$_i$)S:Ag, wherein i is $0.5 < i \leq 0.7$], a silver and aluminium activated zinc cadmium sulfide phosphor [(Zn$_{1-j}$,Cd$_j$)S:Ag,Al, wherein j is $0.5 < j \leq 0.7$], a gold and aluminium activated zinc cadmium sulfide phosphor [(Zn$_{1-k}$,Cd$_k$)S:Au,Al, wherein k is $0 \leq k \leq 0.2$], a copper activated zinc cadmium sulfide phosphor [(Zn$_{1-l}$,Cd$_l$)S:Cu, wherein l is $0.1 < l \leq 0.2$], a copper and aluminium activated zinc cadmium sulfide phosphor [(Zn$_{1-m}$,Cd$_m$)S:Cu,Al, wherein m is $0.1 < m \leq 0.2$], lead and manganese activated calcium silicate phosphor (CaSiO$_3$:Pb,Mn) and mixtures thereof.

2. A low-velocity electron excited fluorescent display device as defined in claim 1 wherein said phosphor is a blue emitting phosphor selected from the group consisting of a silver activated zinc sulfide phosphor (ZnS:Ag), a silver and aluminium activated zinc sulfide phosphor (ZnS:Ag,Al), a silver activated zinc sulfoselenide phosphor [Zn(S,Se):Ag], a silver and aluminium activated zinc sulfoselenide phosphor [Zn(S,Se):Ag,Al], a cerium activated yttrium silicate phosphor (Y$_2$SiO$_5$:Ce), a cerium activated strontium gallium sulfide phosphor (SrGa$_2$S$_4$:Ce), a cerium activated calcium magnesium silicate phosphor (Ca$_2$MgSiO$_5$:Ce), a titanium activated calcium magnesium phosphor [(Ca,Mg)$_2$SiO$_4$:Ti], an europium activated barium magnesium aluminate phosphor [(Ba,Mg)O$_2$.6Al$_2$O$_3$:Eu$^{2+}$], an europium activated strontium barium phosphate phosphor [(Sr,Ba)$_3$(PO$_4$)$_2$:Eu$^{2+}$], an europium activated calcium chloroborate phosphor (Ca$_2$B$_5$O$_9$Cl:Eu$^{2+}$) and mixtures thereof.

3. A low-velocity electron excited fluorescent display device as defined in claim 2 wherein said median value is within the range of 3 to 10μ and said standard deviation is not more than 0.5.

4. A low-velocity electron excited fluorescent display device as defined in claim 2 wherein said conductive material and said blue emitting phosphor are present in a mixing weight ratio ranging from 3:197 to 1:9.

5. A low-velocity electron excited fluorescent display device as defined in claim 2 wherein said conductive material is selected from the group consisting of indium oxide (In$_2$O$_3$), zinc oxide (ZnO), stannic oxide (SnO$_2$), titanium dioxide (TiO$_2$), tungsten oxide (WO$_3$), niobium pentoxide (Nb$_2$O$_5$) and mixtures thereof.

6. A low-velocity electron excited fluorescent display device as defined in claim 5 wherein said conductive material is selected from the group consisting of indium oxide (In$_2$O$_3$), stannic oxide (SnO$_2$), zinc oxide (ZnO) and mixtures thereof.

7. A low-velocity electron excited fluorescent display device as defined in claim 2 wherein said blue emitting phosphor is selected from the group consisting of a silver activated zinc sulfide phosphor (ZnS:Ag), a silver and aluminium activated zinc sulfide phosphor (ZnS:Ag,Al), a silver and aluminium activated zinc sulfoselenide phosphor [Zn(S,Se):Ag,Al], a silver activated zinc sulfoselenide phosphor [Zn(S,Se):Ag] and mixtures thereof.

8. A low-velocity electron excited fluorescent display device as defined in claim 7 wherein said conductive material is indium oxide (In$_2$O$_3$) and said blue emitting phosphor is a silver activated zinc sulfoselenide [Zn(S,Se):Ag].

9. A low-velocity electron excited fluorescent display device as defined in claim 7 wherein said conductive material is indium oxide (In$_2$O$_3$) and said blue emitting phosphor is a silver activated zinc sulfide phosphor (ZnS:Ag).

10. A low-velocity electron excited fluorescent display device as defined in claim 7 wherein said conductive material is indium oxide (In$_2$O$_3$) and said blue emitting phosphor is a silver and aluminium activated zinc sulfide phosphor (ZnS:Ag,Al).

11. A low-velocity electron excited fluorescent display device as defined in claim 7 wherein said conductive material is stannic oxide (SnO$_2$) and said blue emitting phosphor is a silver activated zinc sulfide phosphor (ZnS:Ag).

12. A low-velocity electron excited fluorescent display device as defined in claim 2 wherein said blue emitting phosphor has a particle diameter distribution wherein the median value is within the range of 1 to 20μ and standard deviation is not more than 0.7.

13. A low-velocity electron excited fluorescent display device as defined in claim 12 wherein said median value is within the range of 3 to 10μ.

14. A low-velocity electron excited fluorescent display device as defined in claim 1 wherein said phosphor is a green emitting phosphor selected from the group consisting of a manganese activated zinc silicate phosphor ($Zn_2SiO_4$:Mn), a manganese and arsenic activated zinc silicate phosphor ($Zn_2SiO_4$:Mn,As), a terbium activated rare earth oxysulfide phosphor ($Ln_2O_2S$:Tb, wherein Ln is at least one element selected from the group consisting of Y, Gd, Lu and La), a cerium activated yttrium aluminium gallium oxide phosphor [$Y_3$-$(Al_{1-a},Ga_a)_5O_{12}$:Ce, wherein a is $0 \leq a \leq 0.5$], an europium activated strontium gallium sulfide phosphor ($SrGa_2S_4$:$Eu^{2+}$), a copper and aluminium activated zinc cadmium sulfide phosphor [$(Zn_{1-b},Cd_b)S$:Cu,Al, wherein b is $0 \leq b \leq 0.1$], a copper activated zinc cadmium sulfide phosphor [$(Zn_{1-c},Cd_c)S$:Cu, wherein c is $0 \leq c \leq 0.1$], a silver activated zinc cadmium sulfide phosphor [$(Zn_{1-d},Cd_d)S$:Ag, wherein d is $0.3 \leq d \leq 0.5$], a silver and aluminium activated zinc cadmium sulfide phosphor [$(Zn_{1-e},Cd_e)S$:Ag,Al, wherein e is $0.3 \leq e \leq 0.5$] and mixtures thereof.

15. A low-velocity electron excited fluorescent display device as defined in claim 14 wherein said median value is within the range of 3 to 10μ and said standard deviation is not more than 0.5.

16. A low-velocity electron excited fluorescent display device as defined in claim 14 wherein said conductive material and said green emitting phosphor are present in a mixing weight ratio ranging from 3:197 to 1:9.

17. A low-velocity electron excited fluorescent display device as defined in claim 14 wherein said conductive material is selected from the group consisting of indium oxide ($In_2O_3$), zinc oxide (ZnO), stannic oxide ($SnO_2$), titanium dioxide ($TiO_2$), tungsten oxide ($WO_3$), niobium pentoxide ($Nb_2O_5$) and mixtures thereof.

18. A low-velocity electron excited fluorescent display device as defined in claim 17 wherein said conductive material is selected from the group consisting of indium oxide ($In_2O_3$), stannic oxide ($SnO_2$), zinc oxide (ZnO) and mixtures thereof.

19. A low-velocity electron excited fluorescent display device as defined in claim 14 wherein said green emitting phosphor is selected from the group consisting of an europium activated strontium gallium sulfide phosphor ($SrGa_2S_4$:$Eu^{2+}$), a copper and aluminium activated zinc cadmium sulfide phosphor [$(Zn_{1-b},Cd_b)S$:Cu,Al, wherein b is $0 \leq b \leq 0.1$], a silver activated zinc cadmium sulfide phosphor [$(Zn_{1-d},Cd_d)S$:Ag, wherein d is $0.3 \leq d \leq 0.5$] and mixtures thereof.

20. A low-velocity electron excited fluorescent display device as defined in claim 19 wherein said conductive material is indium oxide ($In_2O_3$) and said green emitting phosphor is a copper and aluminium activated zinc cadmium sulfide phosphor [$(Zn_{1-b},Cd_b)S$:Cu,Al, wherein b is $0 \leq b \leq 0.1$].

21. A low-velocity electron excited fluorescent display device as defined in claim 19 wherein said conductive material is indium oxide ($In_2O_3$) and a green emitting phosphor is an europium activated strontium gallium sulfide phosphor ($SrGa_2S_4$:$Eu^{2+}$).

22. A low-velocity electron excited fluorescent display device as defined in claim 19 wherein said conductive material is indium oxide ($In_2O_3$) and said green emitting phosphor is a silver activated zinc cadmium sulfide phosphor [$(Zn_{1-d},Cd_d)S$:Ag, wherein d is $0.3 \leq d \leq 0.5$].

23. A low velocity electron excited fluorescent display device as defined in claim 19 wherein said conductive material is stannic oxide ($SnO_2$) and said green emitting phosphor is a copper and aluminium activated zinc cadmium sulfide phosphor [$(Zn_{1-b},Cd_b)S$:Cu,Al, wherein b is $0 \leq b \leq 0.1$].

24. A low-velocity electron excited fluorescent display device as defined in claim 14 wherein said green emitting phosphor has a particle diameter distribution wherein the median value is within the range of 1 to 20μ and standard deviation is not more than 0.7.

25. A low-velocity electron excited fluorescent display device as defined in claim 14 wherein said median value is within the range of 3 to 10μ.

26. A low-velocity electron excited fluorescent display device as defined in claim 1 wherein said phosphor is a red emitting phosphor selected from the group consisting of an europium activated rare earth oxysulfide phosphor ($Ln_2O_2S$:Eu, wherein Ln has the same definition as described above), an europium activated rare earth oxide phosphor ($Ln_2O_3$:Eu, wherein Ln has the same definition as described above), an europium activated rare earth vanadate phosphor ($LnVO_4$:Eu, wherein Ln has the same definition as described above), an europium activated rare earth borate phosphor ($LnBO_3$:Eu, wherein Ln has the same definition as described above), an europium activated rare earth phosphate phosphor ($LnPO_4$:Eu, wherein Ln has the same definition as described above), a silver activated zinc cadmium sulfide phosphor [$(Zn_{1-f},Cd_f)S$:Ag, wherein f is $0.65 \leq f \leq 0.9$], a manganese activated zinc phosphate phosphor [$Zn_3(PO_4)_2$:Mn], a manganes activated cadmium borate phosphor ($Cd_2B_2O_5$:Mn) and mixture thereof.

27. A low-velocity electron excited fluorescent display device as defined in claim 26 wherein said median value is within the range of 3 to 10μ and said standard deviation is not more than 0.5.

28. A low-velocity electron excited fluorescent display device as defined in claim 26 wherein said conductive material and said red emitting phosphor are present in a mixing weight ratio ranging from 3:197 to 1:9.

29. A low-velocity electron excited fluorescent display device as defined in claim 26 wherein said conductive material is selected from the group consisting of indium oxide ($In_2O_3$), zinc oxide (ZnO), stannic oxide ($SnO_2$), titanium dioxide ($TiO_2$), tungsten oxide ($WO_3$), niobium pentoxide ($Nb_2O_5$) and mixtures thereof.

30. The low-velocity electron excited fluorescent display device as defined in claim 29 wherein said conductive material is selected from the group consisting of indium oxide ($In_2O_3$), stannic oxide ($SnO_2$), zinc oxide (ZnO) and mixtures thereof.

31. A low-velocity electron excited fluorescent display device as defined in claim 26 wherein said red emitting phosphor is selected from the group consisting of an europium activated yttrium oxysulfide phosphor ($Y_2O_2S$:Eu), an europium activated yttrium vanadate phosphor ($YVO_4$:Eu), an europium activated yttrium borate phosphor ($YBO_3$:Eu), a manganese activated cadmium borate phosphor ($Cd_2B_2O_5$:Mn) and mixtures thereof.

32. A low-velocity electron excited fluorescent display device as defined in claim 31 wherein said conductive material is indium oxide (In$_2$O$_3$) and said red emitting phosphor is an europium activated yttrium oxysulfide (Y$_2$O$_2$S:Eu).

33. A low-velocity electron excited fluorescent display device as defined in claim 31 wherein said conductive material is indium oxide (In$_2$O$_3$) and said red emitting phosphor is an europium activated yttrium borate phosphor (YBO$_3$:Eu).

34. A low-velocity electron excited fluorescent display device as defined in claim 31 wherein said conductive material is stannic oxide (SnO$_2$) and said red emitting phosphor is an europium activated yttrium oxysulfide phosphor (Y$_2$O$_2$S:Eu).

35. A low-velocity electron excited fluorescent display device as defined in claim 26 wherein said red emitting phosphor has a particle diameter distribution wherein the median value is within the range of 1 to 20μ and standard deviation is not more than 0.7.

36. A low-velocity electron excited fluorescent display device as defined in claim 35 wherein said median value is within the range of 3 to 10μ.

37. A low-velocity electron excited fluorescent display device as defined in claim 1 wherein said phosphor is a yellow emitting phosphor selected from the group consisting of a copper activated zinc sulfoselenide phosphor [Zn(S$_{1-g}$,Se$_g$):Cu, wherein g is $0.05 \leq g \leq 0.6$], a copper and aluminium activated zinc sulfoselenide phosphor [Zn(S$_{1-h}$,Se$_h$):Cu,Al, wherein h is $0.05 \leq h \leq 0.6$], a silver activated zinc cadmium sulfide phosphor [(Zn$_{1-i}$,Cd$_i$)S:Ag, wherein i is $0.5 \leq i \leq 0.7$], a silver and aluminium activated zinc cadmium sulfide phosphor [(Zn$_{1-j}$,Cd$_j$)S:Ag,Al, wherein j is $0.5 < j \leq 0.7$], a gold and aluminium activated zinc cadmium sulfide phosphor [(Zn$_{1-k}$,Cd$_k$)S:Au,Al, wherein k is $0 \leq k \leq 0.2$], a copper activated zinc cadmium sulfide phosphor [(Zn$_{1-l}$,Cd$_l$)S:Cu, wherein l is $0.1 < l \leq 0.2$], a copper and aluminium activated zinc cadmium sulfide phosphor [(Zn$_{1-m}$,Cd$_m$)S:Cu,Al, wherein m is $0.1 < m \leq 0.2$], lead and manganese activated calcium silicate phosphor (CaSiO$_3$:Pb,Mn) and mixtures thereof.

38. A low-velocity electron excited fluorescent display device as defined in claim 37 wherein said median value is within the range of 3 to 10μ and said standard deviation is not more than 0.5.

39. A low-velocity electron excited fluorescent display device as defined in claim 37 wherein said conductive material and said yellow emitting phosphor are present in a mixing weight ratio ranging from 3:197 to 1:9.

40. A low-velocity electron excited fluorescent display device as defined in claim 37 wherein said conductive material is selected from the group consisting of indium oxide (In$_2$O$_3$), zinc oxide (ZnO), stannic oxide (SnO$_2$), titanium dioxide (TiO$_2$), tungsten oxide (WO$_3$), niobium pentoxide (Nb$_2$O$_5$) and mixtures thereof.

41. A low-velocity electron excited fluorescent display device as defined in claim 40 wherein said conductive material is selected from the group consisting of indium oxide (In$_2$O$_3$), stannic oxide (SnO$_2$), zinc oxide (ZnO) and mixtures thereof.

42. A low-velocity electron excited fluorescent display device as defined in claim 37 wherein said yellow emitting phosphor is selected from the group consisting of a copper activated zinc sulfoselenide phosphor [(Zn(S$_{1-g}$,Se$_g$):Cu, wherein g is $0.05 \leq g \leq 0.6$], a silver activated zinc cadmium sulfide phosphor [(Zn$_{1-i}$,Cd$_i$)S:Ag, wherein i is $0.5 < i \leq 0.7$], a gold and aluminium activated zinc cadmium sulfide phosphor [(Zn$_{1-k}$,Cd$_k$)S:Au,Al, wherein k is $0 \leq k \leq 0.2$], a copper activated zinc cadmium sulfide phosphor [(Zn$_{1-l}$,Cd$_l$)S:Cu, wherein l is $0.1 < l \leq 0.2$], a copper and aluminium activated zinc cadmium sulfide phosphor [(Zn$_{1-m}$,Cd$_m$)S:Cu,Al, wherein m is $0.1 < m \leq 0.2$] and mixtures thereof.

43. A low-velocity electron excited fluorescent display device as defined in claim 42 wherein said conductive material is indium oxide (In$_2$O$_3$) and said yellow emitting phosphor is a copper activated sulfoselenide phosphor [Zn(S$_{1-g}$,Se$_g$):Cu, wherein g is $0.05 \leq g \leq 0.6$].

44. A low-velocity electron excited fluorescent display device as defined in claim 42 wherein said conductive material is indium oxide (In$_2$O$_3$) and said yellow emitting phosphor is a silver activated zinc cadmium sulfide phosphor [(Zn$_{1-i}$,Cd$_i$)S:Ag, wherein i is $0.5 < i \leq 0.7$].

45. A low-velocity electron excited fluorescent display device as defined in claim 37 wherein said yellow emitting phosphor has a particle diameter distribution wherein the median value is within the range of 1 to 20μ and standard deviation is not more than 0.7.

46. A low-velocity electron excited fluorescent display device as defined in claim 45 wherein said median value is within the range of 3 to 10μ.

* * * * *

UNITED STATES PATENT AND TRADEMARK OFFICE
CERTIFICATE OF CORRECTION

PATENT NO. : 4,275,333
DATED : June 23, 1981
INVENTOR(S) : AKIYASU KAGAMI ET AL

It is certified that error appears in the above-identified patent and that said Letters Patent are hereby corrected as shown below:

On the title page, Item [73],
Change the name of the assignee(s)
from "Dai Nippon Toryo Co., Ltd.
and Japan Electric Industry
Development Association " to
--- Kasei Optonix, Ltd. and
Japan Electric Industry Development
Association ---.

Signed and Sealed this

Thirteenth Day of July 1982

[SEAL]

Attest:

Attesting Officer

GERALD J. MOSSINGHOFF

Commissioner of Patents and Trademarks